(No Model.)

E. W. FARNHAM.
BRACKET FOR USE WITH CURTAIN FIXTURES, &c.

No. 587,684. Patented Aug. 3, 1897.

WITNESSES:
M. D. Blondel
P. B. Turpin

INVENTOR
Edward W. Farnham
BY Munn & Co.
ATTORNEYS.

UNITED STATES PATENT OFFICE.

EDWARD WILSON FARNHAM, OF CHICAGO, ILLINOIS, ASSIGNOR OF ONE-HALF TO C. M. HIGGINSON, OF SAME PLACE.

BRACKET FOR USE WITH CURTAIN-FIXTURES, &c.

SPECIFICATION forming part of Letters Patent No. 587,684, dated August 3, 1897.

Application filed November 12, 1896. Serial No. 611,830. (No model.)

*To all whom it may concern:*

Be it known that I, EDWARD WILSON FARNHAM, of Chicago, in the county of Cook and State of Illinois, have invented a new and useful Improvement in Brackets for Use with Curtain-Fixtures and Otherwise, of which the following is a specification.

My invention is an improved bracket intended especially for curtain-fixtures—such, for example, as shown in my former patent, No. 554,619, dated February 11, 1896—but manifestly the bracket can be put to other uses and be made in various forms and patterns without departing from the broad principles of my invention.

The invention consists in certain novel constructions, combinations, and arrangements of parts, as will be hereinafter described, and pointed out in the claims.

Figure 1:
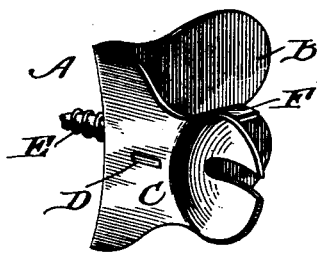
Figure 2:
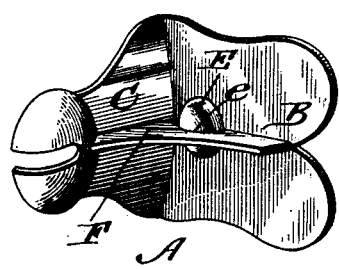
Figure 3:
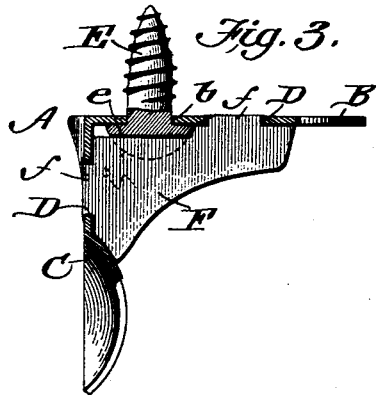
Figure 4:
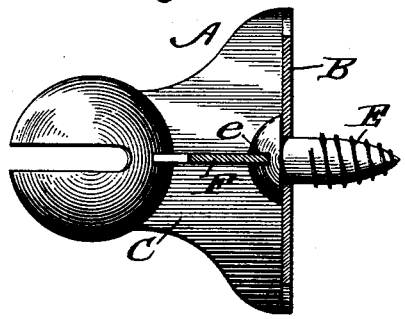
Figure 5:
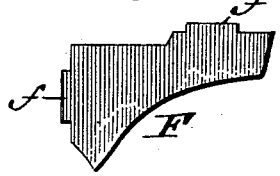

In the drawings, Figures 1 and 2 are perspective views of my bracket. Fig. 3 is a sectional view, and Fig. 4 is a side view, thereof, part in section. Fig. 5 is a detail view.

It is preferred to make the device of sheet-steel stamped out and plated, making a highly-finished bracket of great strength and yet very light. The bracket or main plate A is bent, forming the base-wing B and the flange or bearing-wing C, each of which is provided with a slot D, and the base-wing B has a screw-hole b, through which the screw E is passed, the head of the screw resting above the wing B and having a nick e.

A plate F fits edgewise in the nick and is held to the bracket so the screw is held to the bracket, and can be turned by the said bracket as a screw-driver. In securing the plate F to the bracket or main plate I prefer to form such plate F with lugs f, fitting in the slots D and upset or otherwise suitably secured.

The rib-plate F is put in after the bracket or main plate has been formed and fits and is held in the nick of the screw, holding the screw, so it will not be lost, and acting as a screw-driver at all times.

Having thus described my invention, what I claim, and desire to secure by Letters Patent, is—

1. A bracket substantially as described, provided with a plate having an opening for a screw and with another plate by which to hold said screw substantially as shown and described.

2. A bracket or main plate provided with an opening and a nicked screw in said opening, and with a plate fitting edgewise in the nick of said screw substantially as shown and described.

3. A bracket having base and flange plates, the former having a screw-opening, the screw passed through said opening and having a nick, and the plate fitting in said nick and held to the bracket substantially as shown and described.

4. The herein-described bracket having base and flange wings, such wings having slots and the base-wing having a screw-opening, the screw in said opening and having a nick and the plate fitting edgewise in the screw-nick and having at its ends lugs entering and held in the slots of the main and flange plates all substantially as shown and described.

EDWARD WILSON FARNHAM.

Witnesses:
D. B. MORISON,
C. F. LEMMON.